(12) United States Patent  (10) Patent No.: US 8,577,593 B2
Oesterling et al.  (45) Date of Patent: Nov. 5, 2013

(54) NAVIGATION SYSTEM FOR HEARING-IMPAIRED OPERATORS

(75) Inventors: Christopher L. Oesterling, Troy, MI (US); Julianne Petschke, Shelby Township, MI (US); Mark J. Glaza, Warren, MI (US)

(73) Assignee: General Motors LLC, Detroit, MI (US)

( * ) Notice: Subject to any disclaimer, the term of this patent is extended or adjusted under 35 U.S.C. 154(b) by 2050 days.

(21) Appl. No.: 11/206,957

(22) Filed: Aug. 18, 2005

(65) Prior Publication Data

US 2007/0043503 A1  Feb. 22, 2007

(51) Int. Cl.
G01C 21/30 (2006.01)
G01C 21/32 (2006.01)

(52) U.S. Cl.
USPC .......................................... 701/400

(58) Field of Classification Search
USPC ..................................... 701/1, 211
See application file for complete search history.

(56) References Cited

U.S. PATENT DOCUMENTS

| 3,760,362 | A | | 9/1973 | Copland et al. |
| 5,982,853 | A | * | 11/1999 | Liebermann ..................... 379/52 |
| 6,535,743 | B1 | * | 3/2003 | Kennedy et al. ........... 455/456.1 |
| 6,628,967 | B1 | | 9/2003 | Yue |
| 6,853,910 | B1 | | 2/2005 | Oesterling et al. |

OTHER PUBLICATIONS

U.S. Appl. No. 11/333,654, filed Jan. 17, 2006, Wong et al.

* cited by examiner

*Primary Examiner* — Khoi Tran
*Assistant Examiner* — Nicholas Kiswanto
(74) *Attorney, Agent, or Firm* — Dierker & Associates, P.C.

(57) ABSTRACT

A method for producing navigation instructions is disclosed. The method includes generating a navigation route. The generated navigation route is translated from textual instructions and/or audio prompts to sign language symbols, and the sign language symbols are provided to a vehicle.

19 Claims, 3 Drawing Sheets

NAVIGATION SYSTEM FOR HEARING-IMPAIRED OPERATORS

TECHNICAL FIELD

The present disclosure relates generally to navigation systems, and more particularly to a navigation system for hearing-impaired operators.

BACKGROUND

Vehicle navigation systems are generally capable of generating vehicle navigation instructions, e.g. a route, from the vehicle's current position to a desired destination, as indicated by a user. After generating the route, the navigation system presents the route maneuvers to a user for execution. The navigation system often includes audio alerts and alphanumeric and/or graphical displays for providing the user with the generated route. The user may be prompted by the audio alerts informing the user of impending maneuvers. Further, the alphanumeric and/or graphical instructions may provide visual instructions and/or information regarding the maneuvers.

Those vehicle navigation systems including audio prompts and/or alphanumeric/graphical displays may be disadvantageous for hearing-impaired drivers. One potential problem is that the hearing-impaired user may be unaware that the audio alerts are informing them of impending maneuvers. Another potential problem is that the alphanumeric/graphical instructions may be too detailed to be displayed on an average vehicle display (e.g. radio display). Thus, the navigation system without a larger navigational display system may, in some instances, require undesirable levels of adaptation by a hearing-impaired operator.

As such, it would be desirable to provide a navigation system suitable for hearing-impaired operators/users.

SUMMARY

The present disclosure provides a method and a system for producing navigation instructions. Advantageously, the method includes generating a navigation route, translating the navigation route from at least one of textual instructions and audio prompts to sign language symbols, and providing the sign language symbols to a vehicle.

BRIEF DESCRIPTION OF THE DRAWINGS

Objects, features and advantages of embodiments of the present disclosure may become apparent by reference to the following detailed description and drawings, in which like reference numerals correspond to similar, though not necessarily identical components. For the sake of brevity, reference numerals having a previously described function may not necessarily be described in connection with other drawings in which they appear.

DETAILED DESCRIPTION

Embodiment(s) of the system and method disclosed herein advantageously allow hearing-impaired (e.g. people who are deaf or hard of hearing) operators to more effectively utilize a vehicle navigation system. Rather than relying on audible prompts, embodiment(s) disclosed herein may alert the user via a non-audible signal (e.g. vibration of a tactile signaling device or illumination of a visual signaling device) that the navigation route will be displayed on, for example, a mobile unit located in the vehicle. Embodiment(s) of the method and system also advantageously translate and convert the generated navigation route into sign language symbols, which may advantageously be displayed on a variety of display systems, including a standard vehicle radio display.

It is to be understood that, as defined herein, a user may include vehicle operators and/or passengers.

Figure 1:
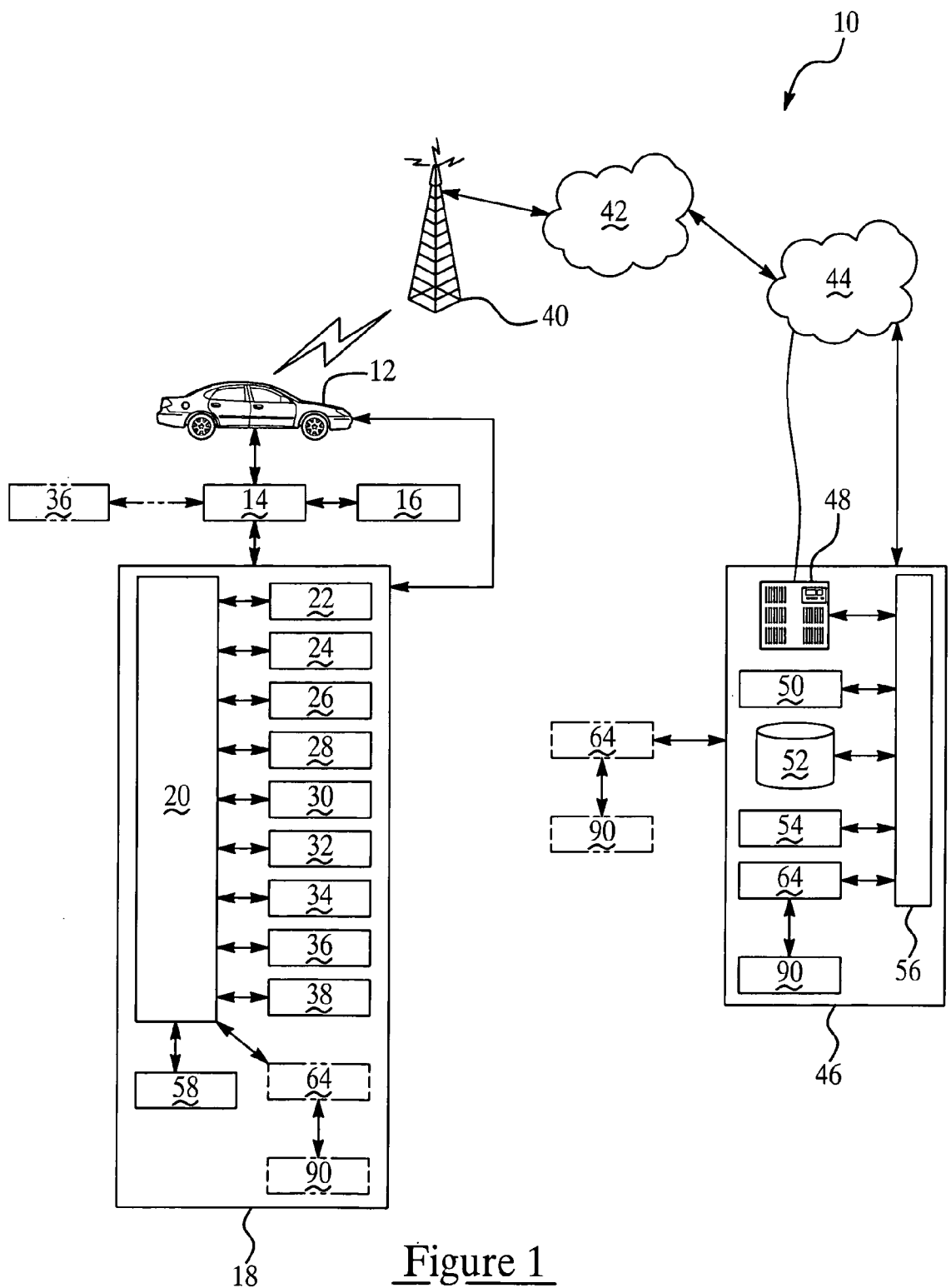
FIG. 1 is schematic diagram depicting an embodiment of a navigation system.

Referring now to FIG. 1, the system 10 includes a vehicle 12, a vehicle communications network 14, a telematics unit 18, a TTY unit 36, a two-way radio frequency communication system (including, but not limited to, one or more wireless carrier systems 40, one or more communication networks 42, and/or one or more land networks 44), and one or more call centers 46. In one embodiment, vehicle 12 is a mobile vehicle with suitable hardware and software for transmitting and receiving voice and data communications. System 10 may include additional components suitable for use in telematics units 18.

In an embodiment, via vehicle communications network 14, the vehicle 12 sends signals from the telematics unit 18 to various units of equipment and systems 16 within the vehicle 12 to perform various functions, such as unlocking a door, executing personal comfort settings, and/or the like. In facilitating interaction among the various communications and electronic modules, vehicle communications network 14 utilizes interfaces such as controller area network (CAN), ISO standard 11989 for high speed applications, ISO standard 11519 for lower speed applications, and Society of Automotive Engineers (SAE) standard J1850 for high speed and lower speed applications.

The telematics unit 18 may send and receive radio transmissions from wireless carrier system 40. In an embodiment, wireless carrier system 40 may be a cellular telephone system and/or any other suitable system for transmitting signals between the vehicle 12 and communications network 42. Further, the wireless carrier system 40 may include a cellular communication transceiver, a satellite communications transceiver, a wireless computer network transceiver (a non-limitative example of which includes a Wide Area Network (WAN) transceiver), and/or combinations thereof.

Telematics unit 18 may include a processor 20 operatively coupled to a wireless modem 22, a location detection system 24 (a non-limitative example of which is a global positioning system (GPS)), an in-vehicle memory 26, a microphone 28, one or more speakers 30, an embedded or in-vehicle TTY compatible mobile phone 32, a TTY unit 36, a short-range wireless communication network 38 (e.g. a Bluetooth® unit), and/or a translation engine 64. In an alternate embodiment, the TTY unit 36 may communicate directly with the vehicle communications network 14, which is coupled to the telematics unit 18. In another alternate embodiment, the translation engine 64 communicates with the call center 46 (described further hereinbelow).

The TTY unit 36 is a telecommunications device for the hearing-impaired user. The TTY unit 36 may include external components, such as a keyboard or a vibrating wristband (shown and described in further detail in FIG. 2), used, for example, to alert the hearing-impaired user of an incoming call and/or an incoming navigation route command.

It is to be understood that the telematics unit 18 may be implemented without one or more of the above listed components, such as, for example, speakers 30. Yet further, it is to be understood that the speaker 30 may be a component of the vehicle audio system, which may accept audio and other signals from the telematics unit 18. Telematics unit 18 may include additional components and functionality as desired for a particular end use.

Processor 20 may be a micro controller, a controller, a microprocessor, a host processor, and/or a vehicle communications processor. In another embodiment, processor 20 may be an application specific integrated circuit (ASIC). Alternatively, processor 20 may be a processor working in conjunction with a central processing unit (CPU) performing the function of a general-purpose processor.

Non-limitative examples of the location detection system 24 include a Global Position Satellite receiver, a radio triangulation system, a dead reckoning position system, and/or combinations thereof. In particular, a GPS provides latitude and longitude coordinates of the vehicle 12 responsive to a GPS broadcast signal received from a GPS satellite constellation (not shown). In-vehicle mobile phone 32 is a TTY compatible cellular type phone, such as, for example an analog, digital, dual-mode, dual-band, multi-mode and/or multi-band cellular phone.

Associated with processor 20 is a real time clock (RTC) 34 providing accurate date and time information to the telematics unit hardware and software components that may require date and time information. In one embodiment date and time information may be requested from the RTC 34 by other telematics unit components. In other embodiments the RTC 34 may provide date and time information periodically, such as, for example, every ten milliseconds.

Processor 20 may execute various computer programs that interact with operational modes of electronic and mechanical systems within the vehicle 12. It is to be understood that processor 20 controls communication (e.g. call signals) between telematics unit 18, wireless carrier system 40, and call center 46.

Further, processor 20 may generate and accept digital signals transmitted between the telematics unit 18 and the vehicle communication network 14, which is connected to various electronic modules in the vehicle 12. In one embodiment, these digital signals activate the programming mode and operation modes within the electronic modules, as well as provide for data transfer between the electronic modules. In another embodiment, certain signals from processor 20 may be translated into vibrations and/or visual alarms.

It is to be understood that software 58 may be associated with processor 20 for monitoring and/or recording the incoming caller utterances.

The communications network 42 may include services from one or more mobile telephone switching offices and/or wireless networks. Communications network 42 connects wireless carrier system 40 to land network 44. Communications network 42 may be any suitable system or collection of systems for connecting the wireless carrier system 40 to the vehicle 12 and the land network 44.

The land network 44 connects the communications network 40 to the call center 46. In one embodiment, land network 44 is a public switched telephone network (PSTN). In another embodiment, land network 44 is an Internet Protocol (IP) network. In still other embodiments, land network 44 is a wired network, an optical network, a fiber network, another wireless network, and/or any combinations thereof. The land network 44 may be connected to one or more landline telephones. It is to be understood that the communications network 42 and the land network 44 connect the wireless carrier system 40 to the call center 46.

Call center 46 contains one or more data switches 48, one or more communication services managers 50, one or more communication services databases 52 containing subscriber profile records and/or subscriber information, one or more communication services advisors 54, one or more network systems 56, and one or more translation engines 64.

Switch 48 of call center 46 connects to land network 44. Switch 48 transmits voice or data transmissions from call center 46, and receives voice or data transmissions from telematics unit 18 in vehicle 12 through wireless carrier system 40, communications network 42, and land network 44. Switch 48 receives data transmissions from, or sends data transmissions to one or more communication service managers 50 via one or more network systems 56.

Call center 46 may contain one or more service advisors 54. In one embodiment, service advisor 54 may be human. In another embodiment, service advisor 54 may be an automaton.

In an embodiment of the method, a hearing-impaired operator/user may initiate a call or a request for a navigation route via an input system. The input system is in communication with the two-way radio frequency communication system. Initiation of the request may be verbal and/or via a physical motion. As such, the input system may include an alphanumeric keypad, a microphone 28, a menu selection system, and/or combinations thereof.

Verbal communication may take place via microphone 28 coupled to the in-vehicle or mobile phone 32 associated with the telematics unit 18. Caller utterances into the microphone 28 are received at a call center 46, which tokenizes the utterance stream for further processing. In one embodiment, the tokenized utterances are placed in a subscriber information database 52 at the call center 46.

Physically initiating a navigation route request may be accomplished via a button press, touch screen, or the like located in the vehicle 12. It is to be understood that the button press or touch screen is operatively connected to the telematics unit 18. Upon the user's initiation of the button press or touch screen, the telematics unit 18 signals the call center 46 of the fact that the user has initiated a request.

A user may inform the call center 46 (either verbally or by using the TTY unit 36) of his/her desired destination. The user may also inform the call center 46 of his/her current position, or alternately, the call center 46 may locate the vehicle's current position via the GPS unit 24.

In an embodiment, the requested navigation route is generated at the call center 46 via an electronic route generator 90. It is to be understood that any other suitable route generator 90 may be used to produce the requested navigation route, including a route generator 90 located onboard the vehicle 12 or located external to the call center 46 and in communication with the translation engine 64. The navigation route is generated in the form of textual instructions and/or audio prompts. As previously indicated, the route in such forms may, in some instances, not be suitable for a hearing-impaired user.

The navigation route generator 90 sends the generated route to a translation engine 64. It is to be understood that the translation engine 64 may be located in the call center 46, or external to, but in communication with, the call center 46, or alternately, in the telematics unit 18. The translation engine 64 receives the generated route in the form of textual instructions and/or audio prompts, and is capable of expressing the textual instructions and/or audio prompts as corresponding sign language abbreviations and/or symbols.

It is to be understood that the translation engine 64 may be configured to translate the navigation route into any desirable sign language symbols. Non-limiting examples of suitable sign language symbols include American Sign Language symbols, Spanish Sign Language symbols, Chinese Sign Language symbols, German Sign Language symbols, British Sign Language symbols, French Sign Language symbols, La Surdite au Quebec symbols, Austrian Sign Language symbols, Belgian Sign Language symbols, Catalonian Sign Language symbols, Czech Sign Language symbols, Danish Sign Language symbols, Estonian Sign Language symbols, Finnish Sign Language symbols, Flemish Sign Language symbols, German-Swiss Sign Language symbols, Greek Sign Language symbols, Hungarian Sign Language symbols, Sign Language symbols, Irish Sign Language symbols, Israeli Sign Language symbols, Italian Sign Language symbols, Maltese Sign Language symbols, Norwegian Sign Language symbols, Polish Sign Language symbols, Portuguese Sign Language symbols, Russian Sign Language symbols, Sign Language symbols of the Netherlands, Swedish Sign Language symbols, Swiss Sign Language symbols, Turkish Sign Language symbols, Yugoslavian Sign Language symbols, and/or combinations thereof.

The communication services databases 52 may store information regarding which of the sign language symbols the particular user is familiar. As such, the translation engine 64 may default to translate to that sign language, unless otherwise instructed by the user.

After the navigation route is translated, the translated route is transferred to a mobile unit and is presented to the user. The mobile unit may be the telematics unit 18, a handheld electronic device (a non-limiting example of which is a personal digital assistant (PDA)), a cellular transceiver, and/or combinations thereof. Generally, transferring the translated route is accomplished by downloading the route to the mobile unit through the land network 44, the communications network 42, the wireless carrier system 40, and the vehicle communications network 14.

Figure 2:
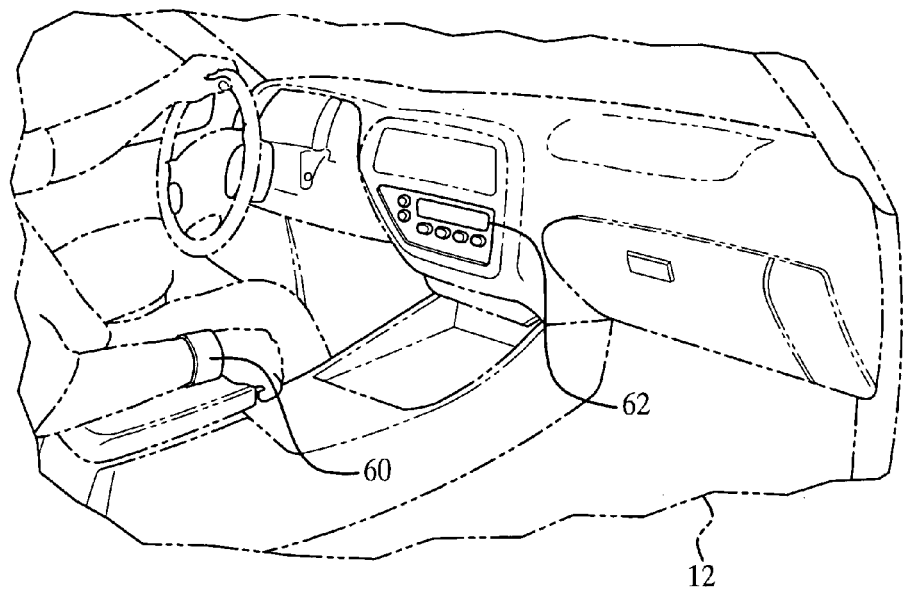
FIG. 2 is a cutaway perspective view of a user in a vehicle including an embodiment of the display system and electronic device.

Presenting the translated route to the user may be accomplished by displaying the translated route on an electronic display system 62 (one example of which is shown in FIG. 2) that is in communication with the two-way radio frequency communication system and is operatively connected to, or is integral with, the mobile unit. A non-limiting example of the electronic display system 62 that is operatively connected to the mobile unit is a vehicle radio display in communication with the telematics unit 18. A non-limiting example of a display system 62 that is integral with the mobile unit is an LCD display screen of a personal digital assistant.

The display system 62 is adapted to be visible to the vehicle operator/passenger and is capable of displaying the sign language symbols. It is to be understood that sign language symbols may also include sign language abbreviations. In an embodiment, the display system 62 is an LCD display, a driver information center display, a radio display, an arbitrary text device, a heads-up display (HUD), a vacuum fluorescent display, and/or combinations thereof. In a non-limiting example, the display 62 is an alphanumeric driver information display that is adapted to communicate, in addition to the sign language symbols, vehicle diagnostic information, audio entertaining system status, compass heading, service interval, climate control system status, vehicle configuration setting, and/or combinations thereof.

The sign language symbols may advantageously be displayed on a relatively small display screen (e.g. a radio display), thus allowing a hearing-impaired user to more efficiently use the navigation system 10 in a vehicle that does not contain a larger display screen (e.g. a navigation system display screen adapted to display area maps, and/or the like). It is to be understood that if the driver has a larger display screen, she/he may request that the navigation instructions be presented in textual format in addition to or in place of the sign language symbols. Display sizes may range from, for example, relatively inexpensive displays accommodating about twelve dot matrix characters to large, fully addressable vacuum fluorescent displays.

Referring now to FIG. 2, another embodiment of presenting the route (translated to sign language symbols and/or in text) to the user is depicted. In this embodiment, the user is alerted that the route is ready to be presented. A signal may be sent from the call center 46 and/or from onboard the vehicle 12, through the components of the system 10 and ultimately to an electronic device 60 that is operatively connected (via a wireless connection, for example via Bluetooth®), to the mobile unit (e.g. the telematics unit 18) and the vehicle communication network 14.

Non-limiting examples of such an electronic device 60 are tactile signaling devices, visual signaling devices, and/or combinations thereof. The tactile signaling device receives the signal and vibrates or shakes in response thereto. It is to be understood that the tactile signaling device may be implemented at any place in the vehicle 12 (e.g. in the steering wheel) or on the user (e.g. in the form of a wristband, as shown in FIG. 2) so that the user is alerted when the signal is received.

The visual signaling device receives the signal and lights up and/or flashes in response thereto. It is to be understood that the visual signaling device may be implemented at any place in the vehicle 12 so that the user is alerted when the signal is received.

In another embodiment, the electronic device 60 may also be used to alert a hearing-impaired driver of an incoming call. When the hearing-impaired user intends to make or receive a phone call via the system 10, if the user is operating the vehicle 12, he/she may generally stop the vehicle 12 in order to activate the TTY unit 36 keyboard for communicating. If the vehicle 12 is in motion and a call is received, the telematics unit 18 may optionally be configured to inform the caller that the driver is occupied. The driver may then be alerted via the electronic device 60 that a call has been received. In an embodiment where the call is related to a request for navigation instructions, the navigation instructions or maneuvers are then presented (in sign language symbols or text) on the display screen 62.

Figure 3:
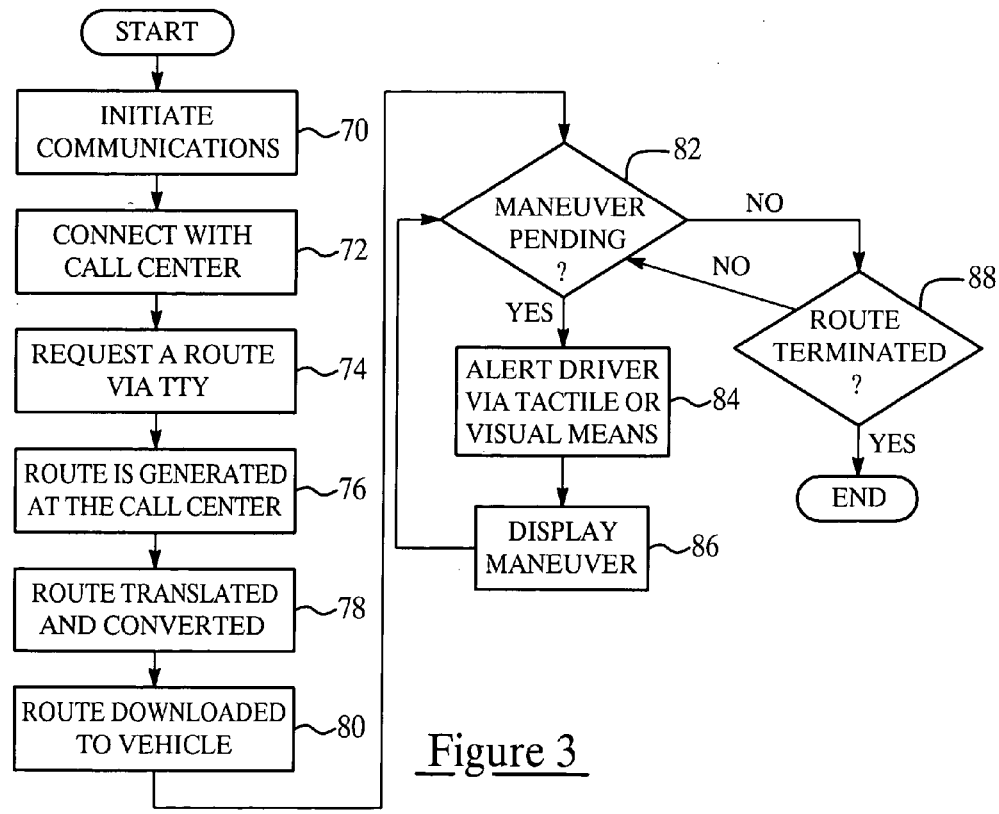
FIG. 3 is a flow diagram depicting an embodiment of a method for producing navigation instructions.

Referring now to FIG. 3, an embodiment of the method for producing navigation instructions for a hearing-impaired user is depicted. The user initiates communication via the input system (either verbally or physically as previously described) to request a navigation route to a desired destination, as depicted at reference numeral 70. Connection is established between the user and the call center 46, as shown at reference numeral 72. In this embodiment, the user requests a route using the TTY unit 36, as depicted at reference numeral 74, and the requested route is generated at the call center 46. The route is translated (as described hereinabove) into sign language abbreviations and/or symbols, as shown at reference numerals 76 and 78, respectively. The translated route is then downloaded to the vehicle 12, as shown at reference numeral 80.

In this embodiment, the system 10 and its associated input components (e.g. location detection system 24) determine whether the route maneuver is upcoming or pending, as shown at reference numeral 82. Generally, a distance threshold coupled with the vehicle speed is used to determine whether a maneuver is upcoming or pending. A distance threshold on a freeway at 70 mph may be about 0.5 miles from the maneuver. However, a distance threshold on a residential street at 25 mph may be about 300 feet from the maneuver. If a maneuver is considered pending, the driver is alerted of the maneuver via a tactile and/or visual signaling device 60, and the maneuver is displayed on the display screen (in sign language symbols or text) 62, respectively indicated at reference numerals 84 and 86.

If, however, the maneuver is considered upcoming, the maneuver is not pending, or the user terminates the route, the mobile unit determines whether the maneuver or navigation route has been completed, as shown at reference numeral 88. If the user has performed the maneuver, reaches the desired destination, or voluntarily terminates the route, the method is complete, and the user is not alerted. However, if the system 10 recognizes that the user has not reached the final destination, the system 10 reevaluates the user's position and the route, and determines if a current maneuver is upcoming or pending. If additional maneuvers are pending, and the user does not terminate the route, the method returns to step 82.

Figure 4:
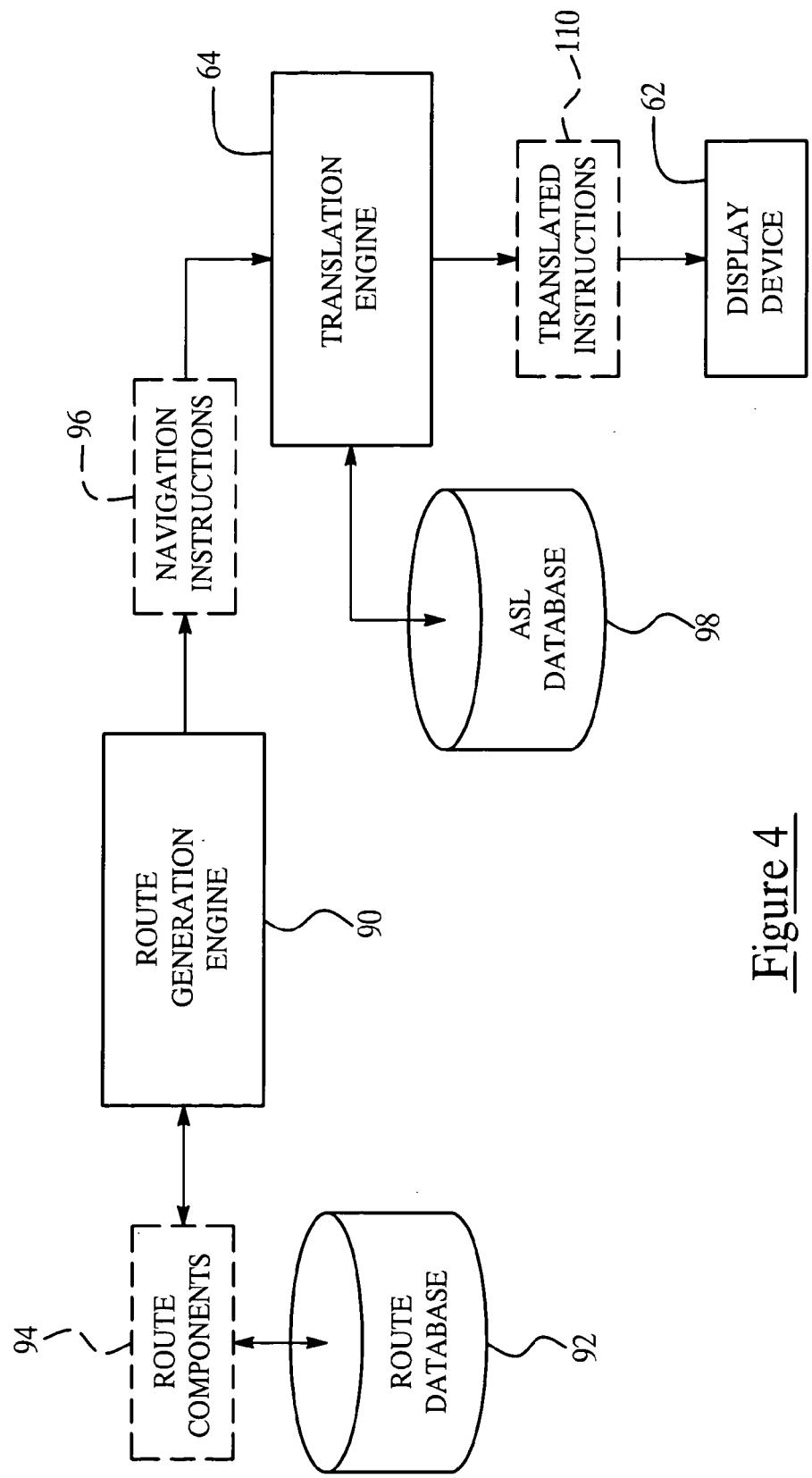
FIG. 4 is a schematic diagram depicting sub-components of an embodiment of a navigation system.

Referring now to FIG. 4, various sub-components of the system 10 for producing navigation instructions for a hearing-impaired user are depicted. The route generator (i.e. route generation engine) 90 responds to a route request generated by the user via system 10. The route generation engine 90 accesses a route database 92 for determining the requested route from the starting address or current position of the user to the ending address or destination of the user. Route database 92 provides the individual components 94 of the desired route, such as, for example, the road segment names and/or road segment attributes. The term "road segment attributes," as used herein, may include, but is not limited to the speed associated with a road segment, the type of road segment (non-limitative examples of which include expressways or secondary road segments), the number of lanes in the road segment, the direction of the road segment (a non-limitative example of which includes a one-way road segment), intersection data, and combinations thereof.

Route generation engine 90 contains one more graph traversal algorithms to concatenate the extracted road components 94 into a cohesive route. A non-limiting example of a graph traversal algorithm is Dijksta's algorithm, which constructs an optimal path from the beginning address or starting point to the end address or destination. It is to be understood that any suitable graph traversal algorithms may be used.

The navigation instructions 96 are output by the route generation engine 90 and transferred to a translation engine 64. In one embodiment, the navigation instructions 96 may be streamed to the translation engine 64. In another embodiment, the navigation instructions 96 may be contained in a file, and the file may be transferred to the translation engine 64.

As the navigation instructions 96 are streamed or transferred to the translation engine 64, the translation engine 64, in one embodiment, examines each navigation instruction 96 and attempts to translate each token in the instruction by accessing an ASL (American Sign Language) database 98 containing ASL symbols. It is to be understood that a plurality of sign language databases may be utilized. Tokens in the navigation instructions 96 include the individual or atomic text components of the instruction, such as, for example, the words TURN and LEFT. In a non-limitative example, if the navigation instruction 96 contains the tokens TURN and LEFT, then the translation engine 64 will provide TRN for TURN and LFT for LEFT.

The translated instructions 110 are then communicated to a display device 62, such as, for example, those previously described which include, but are not limited to the TTY unit 36, the TTY compatible mobile phone 32, and the radio display.

While several embodiments have been described in detail, it will be apparent to those skilled in the art that the disclosed embodiments may be modified. Therefore, the foregoing description is to be considered exemplary rather than limiting.

The invention claimed is:

1. A method for producing navigation instructions, the method comprising:
   generating a navigation route;
   translating the navigation route from at least one of textual instructions or audio prompts to sign language symbols;
   transmitting a non-audible signal to a vehicle, thereby indicating that the translated navigation route is ready to be provided; and
   providing the sign language symbols to the vehicle.

2. The method of claim 1 wherein the sign language symbols include at least one of American Sign Language symbols, Spanish Sign Language symbols, Chinese Sign Language symbols, German Sign Language symbols, British Sign Language symbols, French Sign Language symbols, La Surdite au Quebec symbols, or combinations thereof.

3. The method of claim 1 wherein generating the navigation route comprises:
   initiating a navigation route request from a user; and
   communicating the navigation route request from the user to a navigation route generator.

4. The method of claim 3 wherein the user initiates the navigation route request via at least one of verbal communications or physical communications.

5. The method of claim 3 wherein communicating the navigation route request is accomplished by transmitting the navigation route request to at least one of a call center, a telematics unit, or combinations thereof.

6. The method of claim 1 wherein the navigation route is translated from textual instructions to sign language symbols by a translation engine capable of expressing the textual instructions as corresponding sign language symbols.

7. The method of claim 1 wherein the navigation route is translated from audio prompts to sign language symbols by a translation engine capable of expressing the audio prompts as corresponding sign language symbols.

8. The method of claim 1 wherein providing the sign-language symbols to the vehicle includes:
   transferring the translated route to a mobile unit; and
   presenting the translated route to a user.

9. The method of claim 8 wherein the mobile unit is at least one of a telematics unit, a handheld electronic device, a personal digital assistant, a cellular transceiver, or combinations thereof, and wherein transferring the translated route is accomplished by downloading the translated route to the mobile unit.

10. The method of claim 9 wherein presenting the translated route to the user includes displaying the translated route on a display system operatively connected to the mobile unit, the display system capable of displaying sign language symbols.

11. The method of claim 8 wherein transmitting the non-audible signal includes signaling an electronic device that is operatively connected to the mobile unit, the electronic device being at least one of a tactile signaling device or a visual signaling device.

12. The method of claim 10 wherein the display system is at least one of an LCD display, a driver information center display, a radio display, an arbitrary text device, a heads-up display, a vacuum fluorescent display, or combinations thereof.

13. The method as defined in claim 9 wherein presenting the translated route to the user includes displaying the translated route on a display system that is at least one of operatively connected to or integral with the mobile unit, the display system capable of displaying sign language symbols.

14. A system for producing navigation instructions, comprising:
   means for generating a navigation route;
   means for translating the navigation route from at least one of textual instructions or audio prompts to sign language symbols;
   means for transmitting a non-audible signal to a vehicle, the signal indicating that the translated navigation route is ready to be provided; and
   means for providing the sign language symbols to the vehicle.

15. The system of claim 14, further comprising means for selecting sign language symbols including at least one of American Sign Language symbols, Spanish Sign Language symbols, Chinese Sign Language symbols, German Sign Language symbols, British Sign Language symbols, French Sign Language symbols, La Surdite au Quebec symbols, or combinations thereof.

16. A navigation system, comprising:
   a location detection system operatively disposed within a vehicle;
   a two-way radio frequency communication system in communication with the location detection system;
   an electronic display system in communication with the two-way radio frequency communication system, the electronic display system having a display system adapted to be visible to a vehicle passenger, the display system adapted to display a navigation route translated into sign language symbols;
   an electronic device in communication with the two-way radio frequency communication system, the electronic device being at least one of a tactile signaling device or a visual signaling device, and the electronic device configured to alert the vehicle passenger of at least one of an incoming call or an incoming navigation route command via the radio frequency communication system; and
   an input system adapted for use by the vehicle passenger, the input system in communication with the two-way radio frequency communication system.

17. The navigation system as defined in claim 16 wherein the location detection system comprises at least one of a Global Position Satellite (GPS) receiver, a radio triangulation system, a dead reckoning position system, or combinations thereof.

18. The navigation system as defined in claim 16 wherein the display system is an alphanumeric driver information display adapted to communicate at least one of vehicle diagnostic information, audio entertaining system status, compass heading, service interval, climate control system status, vehicle configuration settings, or combinations thereof.

19. The navigation system as defined in claim 16 wherein the radio frequency communication system is at least one of a cellular communication transceiver, a satellite communication transceiver, or a wireless computer network transceiver.

* * * * *